J. NILSON.
CARRIER.
APPLICATION FILED MAR. 21, 1914.
1,103,615.
Patented July 14, 1914.
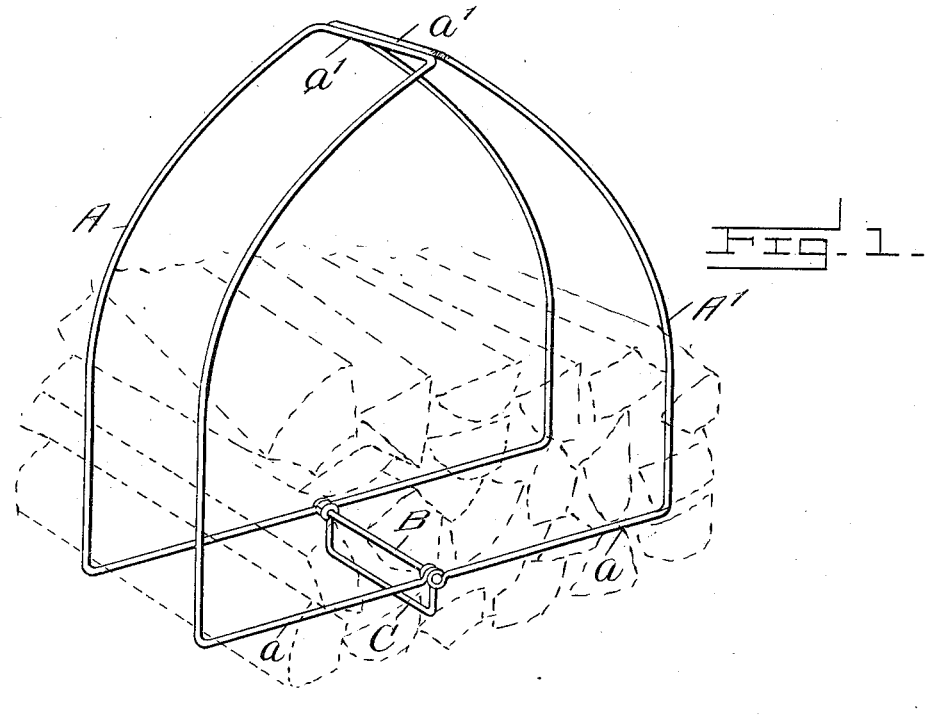
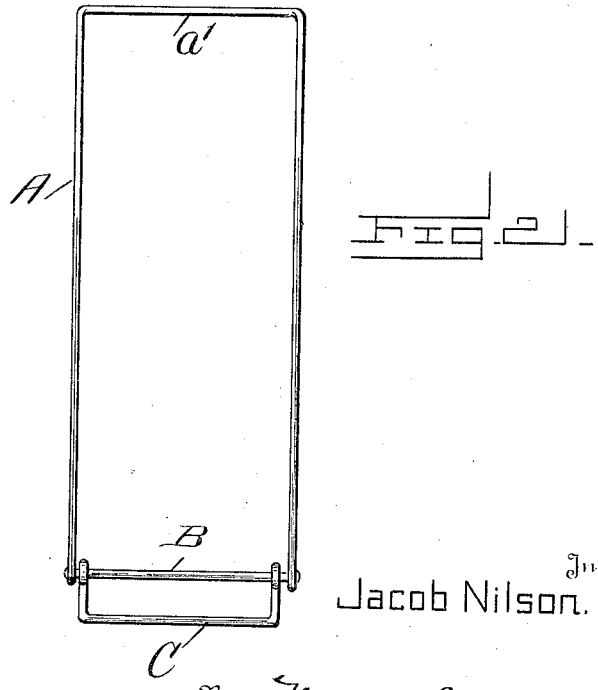
Jacob Nilson.

UNITED STATES PATENT OFFICE.

JACOB NILSON, OF CLEARBROOK, MINNESOTA.

CARRIER.

1,103,615. Specification of Letters Patent. Patented July 14, 1914.

Application filed March 21, 1914. Serial No. 826,222.

*To all whom it may concern:*

Be it known that I, JACOB NILSON, a citizen of the United States, and a resident of Clearbrook, in the county of Clearwater and State of Minnesota, have invented a new and useful Improvement in Carriers, of which the following is a specification.

My present invention relates generally to carriers, and more particularly to a carrier especially adapted for use in handling sawed and split stove wood in order to obviate the necessity of carrying such wood in the arms, and thus filling the clothes with dirt and splinters.

In carrying out my invention I preferably employ the structure shown in the accompanying drawing forming a part of this specification, and in which—

Figure 1 is a perspective view illustrating my invention, and Fig. 2 is an end view with one of the carrier frames removed.

Referring now to these figures, my invention preferably includes a pair of similarly shaped wire frames A and A', the lower portions of which frames are bent substantially in straight lines as at $a$ to provide a suitable base for the carrier, and the sides of these frames being bent to upstand at the outer ends of the lower straight portions $a$, and having their upper extremities curved inwardly into contacting relation as best shown in Fig. 1.

Each of the frames mentioned consists of a single piece of wire bent into U-shape, the integral cross bars $a'$ of these U-shaped frames being arranged at the upper ends of the carrier sides so that by contacting as above described, they form a handle.

The ends of the wire extensions of each of the frames, at the inner extremities of the lower straight portions $a$, are bent to loosely encircle the end portions of a substantially transverse pivot bar B, the extremities of which pivot bar are headed to prevent accidental displacement of the frame extensions.

Loosely engaging the pivot bar is a small handle C also consisting of a U-shaped wire, the extensions of which are bent around the pivot bar upon the inner sides of the frame extensions. In this manner the bent inner extremities of the frame extensions are confined against lateral displacement between the similarly bent extensions of the handle C and the headed ends of the pivot bar B just mentioned.

In practical use the carrier is partially filled with sawed and split stove wood, or like articles, resting on the straight lower portions $a$ of the side frames, as shown in Fig. 1, and confined between the upstanding side portions of these frames. The frames are prevented from spreading by the operator who grasps the cross bars $a'$ forming a handle, and when it is desired to discharge the wood from the carrier, the latter is reversed and the handle C is grasped, thus permitting the outer ends of the carrier frames to move apart for this purpose.

By the use of a carrier such as proposed by my invention, and which will be seen to be simple, and effective for this purpose, all danger from splinters is eliminated inasmuch as the wood, after disposition within the carrier, need not be handled again.

I claim:

1. A carrier comprising a pair of side frames, the lower portions of which extend in substantially straight lines to form the base of the carrier, and the upper portions of the sides of which are curved inwardly and contact at their extremities to form a handle, a transverse pivot bar having headed ends and around which the inner extremities of the lower straight frame portions are loosely bent to form a fulcrum upon which the frames are movable toward and away from one another, and a discharge handle, the extensions of which are bent around the pivot bar at the inner sides of the bent extremities of the frames in order to confine the latter against lateral displacement, each of the said frames consisting of a single piece of wire of U-form with its cross bar at the upper end of the carrier.

2. A carrier comprising a pair of side frames, each consisting of a single piece of wire of substantially U-form, a transverse pivot bar around which the lower extensions of the frames are bent, and a U-shaped handle the extensions of which are also bent around the pivot bar, whereby the carrier may be supported in inverted position to discharge its load.

3. A carrier comprising a pair of side frames, the upper ends of which are movable toward and away from one another, a pivot bar connecting the lower ends of the side frames, and a handle engaging the pivot bar whereby the carrier may be held in inverted position to discharge the contents of the carrier, all for the purpose described.

JACOB NILSON.

Witnesses:
   HARDIN A. ANDERSON,
   ALBERT ANDERSON.

---

Copies of this patent may be obtained for five cents each, by addressing the "Commissioner of Patents, Washington, D. C."